United States Patent [19]

Mermis

[11] 4,325,216

[45] Apr. 20, 1982

[54] THERMODYNAMIC FLOTATION ENGINE

[76] Inventor: Ronald F. Mermis, 1900 Gardenia Ter., Manhattan, Kans. 66502

[21] Appl. No.: 155,553

[22] Filed: Jun. 2, 1980

[51] Int. Cl.³ .............................................. F03B 13/12
[52] U.S. Cl. ........................................ 60/496; 60/531
[58] Field of Search ................. 60/495, 496, 530, 531

[56] References Cited

U.S. PATENT DOCUMENTS 3,410,086 11/1968 Bodkin ................................ 60/531
4,233,813 11/1980 Simmons ............................. 60/496

Primary Examiner—Allen M. Ostrager
Assistant Examiner—Stephen F. Husar
Attorney, Agent, or Firm—Schmidt, Johnson, Hovey & Williams

[57] ABSTRACT

A thermodynamic flotation engine designed to operate using waste heat contained in hot fluids such as water is provided which is of simple construction and allows for continuous operation with no other outside energy source being required. The engine includes an upright fluid tank adapted to receive the hot fluid, with a continuous loop member having a series of discrete bladders mounted thereon. The loop member is supported for continuous movement of successive portions thereof into and out of the fluid filled tank from bottom to top, as by means of a pair of spaced apart pulley members. The respective bladders hold a material such as acetone having a vaporization temperature below the temperature of the hot fluid within the tank; as the bladders successively pass into the tank, the material vaporizes to inflate the bladders, and the buoyancy effect thereby created serves to shift the loop member upwardly; the process is continuous inasmuch as the material in each bladder is reconverted to the liquid form after the bladder leaves the upper end of the fluid tank, with consequent deflation of the bladders. A power takeoff associated with the shiftable bladder-carrying loop member allows the engine to be used as a motive unit.

15 Claims, 4 Drawing Figures

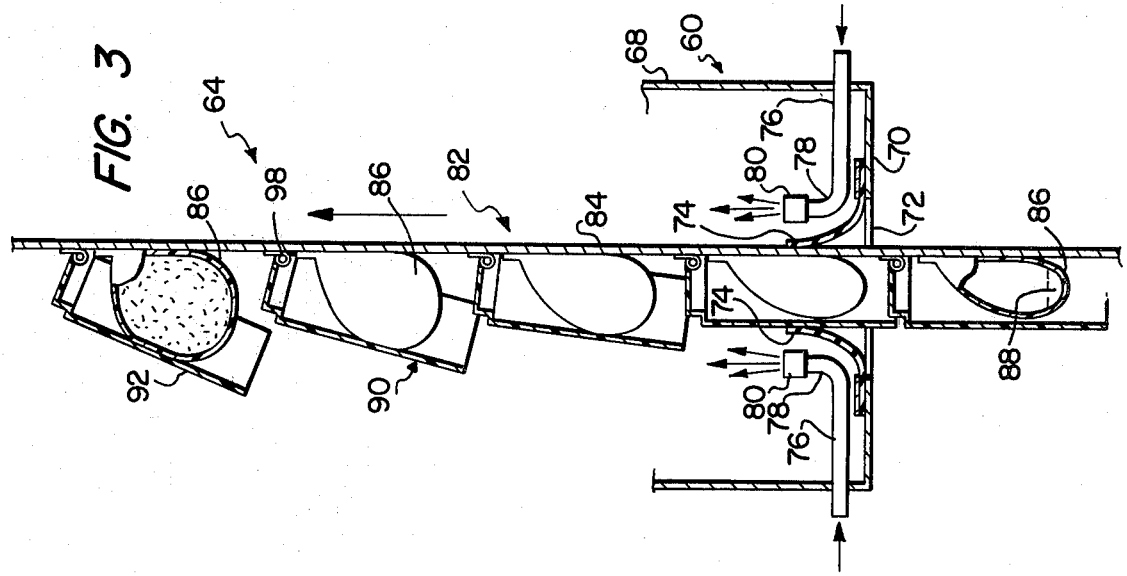
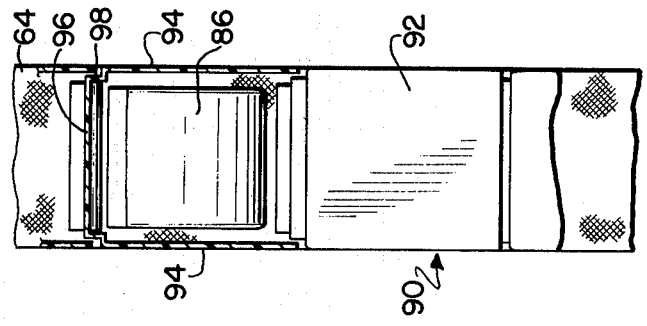
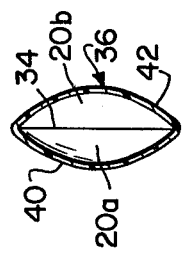
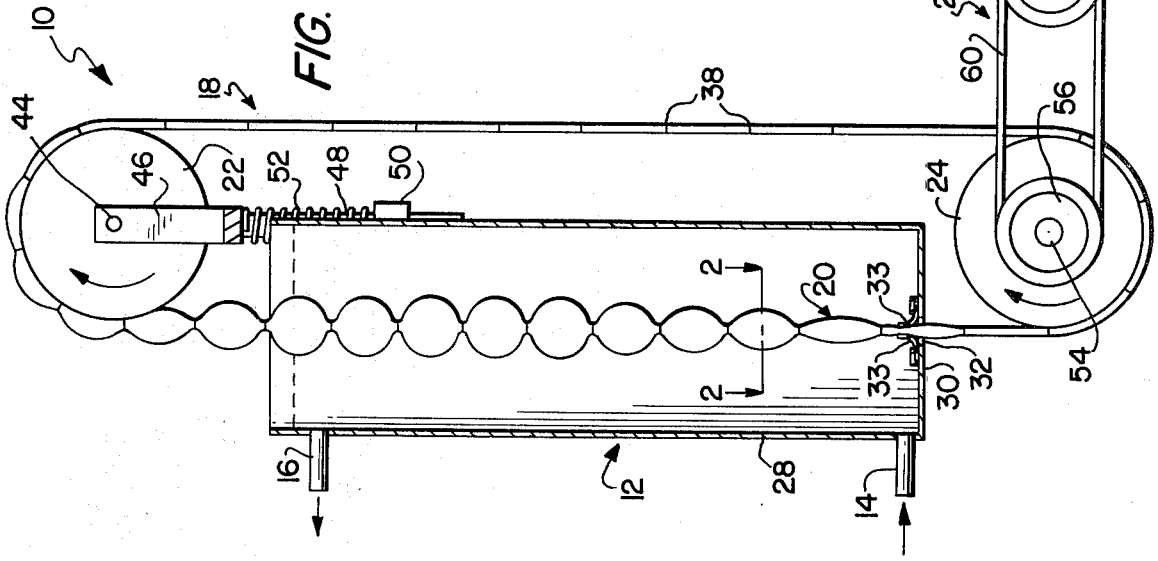

THERMODYNAMIC FLOTATION ENGINE

BACKGROUND OF THE INVENTION

1. Field of the Invention

The present invention is broadly concerned with a novel thermodynamic flotation engine (and a corresponding method) which is designed for the extraction of energy from the heat contained in hot fluids, and for the conversion of such energy to do useful work. More particularly, it is concerned with such a flotation engine which is designed for continuous, cyclical operation using as the sole source of energy a hot fluid such as hot water. As heat is withdrawn from the fluid and converted into mechanical energy, the fluid is cooled; accordingly, the engine of the present invention can also serve as a medium for cooling the initially hot fluid.

2. Description of the Prior Art

The recent energy crisis and the consequent spiraling in costs of conventional fuels has led to a vast array of proposals directed to both energy conservation and the more efficient use of energy resources. Under these modern-day conditions, workers in the art now give serious consideration to sources of energy heretofore simply wasted.

To give but one example, power generating stations of both the nuclear and conventional variety use large volumes of cooling water. During power generation, the water is used to cool vital plant components, and thereafter the heated water is directed to cooling towers or ponds where the temperature of the water is lowered for reuse. As can be appreciated, the energy value of the hot water in such operations is simply wasted, inasmuch as there has heretofore been no practical way of converting the heat energy into useful mechanical energy.

The same problem arises in connection with many manufacturing processes which must use large volumes of cooling water. Here again, the thermal energy within the cooling water is simply wasted.

Accordingly, there is a real and unsatisfied need for a device and method which can make efficient use of the thermal energy of hot fluids, in order to convert such energy to useful forms.

SUMMARY OF THE INVENTION

The present invention provides an answer to the above problem by provision of a thermodynamic flotation engine specifically designed to convert thermal energy within hot fluids into mechanical energy. The flotation engine of the invention broadly comprises an upright fluid tank adapted to hold a hot fluid such as water, along with means defining a continuous loop member having a series of discrete heat-transferring bladder means thereon. The loop member is supported with an elongated portion thereof within the fluid tank, and is shiftable for movement of the loop member through the tank with successive portions thereof moving into the tank at a lower region thereof, through the hot fluid therein, and thence out of the tank at an upper region. Each bladder holds a quantity of liquid material which has a vaporization temperature below that of the hot fluid but above that of the ambient temperature exteriorly of the tank. Thus, as each respective bladder member passes into the tank the liquid material (e.g., acetone having a boiling point of about 133° F., carbon tetrachloride or a freon material) is vaporized and consequently causes upward shifting of the loop member by virtue of the buoyancy effect. After leaving the tank the material within each successive bladder is reconverted to the liquid form thereof, so that the process is rendered continuous. A power takeoff is operatively coupled to the shiftable loop member so that the engine can serve as a motive unit.

In preferred forms the tank includes a lower inlet at the base thereof having a flap-type seal which engages the loop member as the latter shifts. Further, the tank can be equipped with a fluid inlet and outlet for continuous passage of fluid through the tank; in one embodiment, the fluid inlet may be in the form of one or more nozzles disposed adjacent the flap seal members for forcing hot fluid upwardly into the tank under pressure, thereby creating a localized zone of lowered pressure proximal to the loop member inlet; in this fashion, the seal presented by the flap members is enhanced. Hot fluid can also be provided by placing a heat exchange unit within the tank and heating water or other fluid therein for operational purposes.

In other forms of the invention, a pivotal cover is provided for each bladder member in order to facilitate maintenance of a fluid tight seal at the lower inlet region of the tank.

BRIEF DESCRIPTION OF THE DRAWING

FIG. 1 is an essentially schematic view in partial vertical section illustrating a thermodynamic flotation engine in accordance with the invention;

FIG. 2 is a sectional view taken along line 2—2 of FIG. 1 which illustrates the construction of the loop member associated with the engine;

FIG. 3 is an essentially schematic, fragmentary vertical sectional view of another embodiment of the invention; and FIG. 4 is a fragmentary view in partial vertical section illustrating the construction of the loop member associated with the FIG. 3 embodiment.

DESCRIPTION OF THE PREFERRED EMBODIMENTS

Turning now to the drawing, a thermodynamic flotation engine 10 in accordance with the invention is illustrated in FIG. 1. Broadly speaking, the engine 10 includes an upright fluid tank 12 having a hot fluid inlet 14 and a spaced, cooled fluid outlet 16. A continuous loop member 18 is also provided which includes a series of discrete bladders 20 thereon. The loop member 18 is supported by means of spaced upper and lower pulleys 22, 24, with an elongated portion of the loop member within tank 12. The loop member is thereby supported for movement through the tank 12 with successive portions thereof moving into the tank, through the fluid therein, and thence out of the tank. A power takeoff assembly 26 is operatively secured to lower pulley 24 in order that engine 10 can serve as a motive unit.

In more detail, the tank 12 is an open top member including upright, tubular sidewall 28, and a bottom wall 30 having an aperture 32 therethrough. A pair of opposed, flexible, flap-type sealing elements 33 are secured to wall 30 adjacent aperture 32 and are designed to sealingly engage the loop member 18 during operation of engine 10. The hot fluid inlet 14 is disposed adjacent bottom wall 30, whereas outlet 16 is located near the upper end of the tank.

Loop member 18 is in the form of an elongated, thin, continuous web 34 (see FIG. 2) disposed within an elongated, continuous tubular sheath 36. The sheath 36 is secured to web 34 at the respective end margins of the latter, and also at spaced, transversely extending connection locations 38 along the length of the sheath. Thus, between the transverse connections 38, respective bladders are defined. Referring to FIG. 2, it will be seen that a bladder 20a is defined by one face of web 34, and the opposed portion 40 of sheath 36 between adjacent connections 38. Similarly, another bladder 20b is defined between the opposite face of the web 34 and the opposed portion 42 of sheath 36. Thus, separate bladder means are defined on both sides of the web 34.

The web 34 and sheath 36 should preferably be formed of a strong, tough synthetic resin material; moreover, for reasons which will become plain, the material used for the sheath 36 must be heat-transferring.

Each bladder contains an appropriate, relatively minor quantity of a liquid material such as acetone which has a vaporization temperature below that of the hot fluid within tank 12 but above that of the ambient temperature exteriorly of the tank. A wide variety of organic materials can be used in this context, but the relative cheapness and availability of acetone make it the material of choice.

Upper pulley 22 is of known construction and is mounted for rotation about a shaft 44. The shaft 44 is in turn secured to a depending support 46. The support 46 is mounted on an upright rod 48, the latter being secured to sidewall 28 of tank 12 by means of mounting block 50. Biasing means in the form of a spring 52 is disposed between block 50 and the lower end of support 46, for the purpose of yieldably biasing pulley 22 upwardly.

Lower pulley 24 is mounted for rotation on a conventionally supported shaft 54. The power takeoff assembly 26 includes a secondary pulley 56 likewise journaled on shaft 54. Another pulley 58 also forms a part of the power takeoff 26, along with a belt 60 trained about pulleys 56, 58. Thus, it will be appreciated that rotation of pulley 24 serves to rotate pulley 58 through the medium of belt 60. Pulley 58 is mounted on a shaft 62, which serves as an output drive shaft for the power takeoff. Any one of a number of power-accepting devices can be operatively coupled to shaft 62 in the known manner.

In the operation of engine 10, a hot fluid is directed to tank 12 through inlet 14. This causes vaporization of the respective quantities of material within the bladders 20 disposed in contact to the hot fluid. As such, the buoyancy effect created by the vaporization of the material moves the bladders and thereby the entire loop member 18 upwardly through the hot fluid. As the expanded bladders pass out of tank 12 into ambient atmosphere, the material is reconverted to the liquid form thereof, with the result that the bladders assume their normal, relatively flattened configuration. Operation of the engine 10 continues in this manner with successive portions of the loop member 18 moving into the tank through aperture 32 and past seals 33, through the hot fluid therein, and thence out of the tank. As heat is exchanged between the initially hot fluid and the material within the respective bladders 20, the fluid is correspondingly cooled. The partially cooled fluid is withdrawn from tank 12 via outlet 16, and fresh quantities of hot fluid are introduced into the tank. Thus, the engine 10 operates to continuously convert the thermal energy within the hot fluid into useful mechanical energy, and at the same time cools the fluid for reuse.

During operation of the engine 10, the biasing spring 52 serves to maintain upper pulley 22 in a proper, upwardly biased position so that appropriate tension is maintained on the loop member 18. Biasing means of this nature is advantageous, inasmuch as ambient temperature changes from day to day can affect the operational characteristics of the engine, and particularly the rapidity of reconversion of the gaseous form of the bladder material into the liquid form thereof, after the respective bladders pass out of tank 12.

FIG. 3 illustrates another engine 64 in accordance with the invention. In this case the engine includes an upright, open-top fluid tank 66 defined by a sidewall 68 and a bottom wall 70 having a relatively large aperture 72 therein. Four flap-type seals 74 are secured to bottom wall 70 adjacent opening 72, and cooperatively present a substantially square inlet zone. In addition, a plurality of hot fluid inlets 76 are provided with the engine 64, and each inlet 76 extends into tank 12 to a point adjacent a corresponding flap seal 74. The innermost end of each inlet 76 is upturned as at 78, and is provided with a nozzle 80. Note that the outlet ends of the nozzle 80 are slightly above the upper margins of the adjacent seals 74.

The engine 64 further includes a loop member 82 which is trained about respective upper and lower spaced pulleys (not shown) in a manner identical to engine 10. The loop member 82 includes an elongated, continuous web 84 which has an elongated portion thereof extending through the tank 66. Respective individual bladders 86 formed of heat-transferring synthetic resin material are secured to the outer face of web 84 in spaced relationship to one another. Each bladder 86 is filled with a quantity of material 88 which has a vaporization temperature lower than that of the hot fluid within tank 66. In addition however, an individual cover 90 is provided for each bladder 86. The covers 90 each include an elongated, rectangular front wall 92, spaced apart sidewalls 94, and a top wall 96. Each cover is pivotally secured to web 84 at a point above the corresponding bladder 86, by means of hinge structure 98.

During operation of engine 64, hot fluid is introduced through the inlet 76 into tank 66. By virtue of the configuration and location of the inlet 76 and the nozzles 80, the hot fluid is discharged upwardly into the tank 66 under pressure at a point proximal to the flap seals 74. This creates a localized zone of relatively lowered pressure adjacent the flap seals in order to facilitate the sealing action thereof against the hydraulic pressure of the fluid within the tank.

The continuous, cyclical operation of engine 64 proceeds in the manner described with respect to engine 10. During the vaporization cycle, the material 88 within each bladder 86 vaporizes and the buoyancy thus created shifts the loop member; the covers 90 pivot open during this sequence as illustrated. When the material within each bladder is reconverted to the liquid form thereof after passage of the bladder back into the atmosphere, the cover 90 comes back into its normal bladder-covering orientation. The chief purpose of the covers 90 is to facilitate maintenance of a continuous seal at the flap-type seals 74. Thus, the respective covers 90, in association with web member 84, present, at the lower inlet opening 72, a substantially continuous, rectangular in cross-section structure. This in turn allows the flap seal 74 to engage a relatively smooth, continuous surface to enhance the sealing effect.

It will be apparent to those skilled in the art that the principles of the present invention may find application in a wide variety of actual physical forms. Accordingly, it should be understood in this respect that the above-described embodiments are illustrative in nature, and that the invention is not limited to such specific structural manifestations.

Having thus described the invention, what is claimed as new and desired to be secured by Letters Patent is:

1. A thermodynamic engine comprising:
   an upright tank for holding a heated fluid;
   means defining a continuous loop member having a series of discrete heat-transferring bladder means thereon;
   structure for supporting said loop member with an elongated portion thereof within said tank, and for allowing continuous shifting movement of the loop member through said tank with successive portions thereof moving into said tank at a lower region thereof, through the hot fluid therein, and thence out of said tank at an upper region thereof,
   said tank including a loop member inlet at said lower region, and a loop member outlet at said upper region;
   a quantity of liquid material within each bladder having a vaporization temperature below that of said hot fluid but above that of the ambient temperature exteriorly of said tank, such that the material in each respective bladder means is successively converted to the gaseous form thereof as the respective bladder means passes through the hot fluid in said tank for causing upward shifting of the loop member by virtue of the buoyancy effect created by such vaporization, said material in each successive bladder means reconverted to the liquid form thereof after the respective bladder means pass out of said tank; and
   power takeoff means operatively coupled to said loop member.

2. The engine as set forth in claim 1, said loop member comprising an elongated, thin web, said bladder means being secured to said web.

3. The engine as set forth in claim 2, there being bladder means on both sides of said web.

4. The engine as set forth in claim 1, said loop member supporting structure comprising an upper pulley and a lower pulley, said loop member being trained about said upper and lower pulleys.

5. The engine as set forth in claim 4, including means for biasing said upper pulley upwardly.

6. The engine as set forth in claim 4, said power takeoff including structure operatively coupled to said lower pulley for powered rotation thereof in response to said shifting movement of the loop member and consequent rotation of the lower pulley.

7. The engine as set forth in claim 1, said loop member inlet comprising a flap seal having a pair of loop member-engaging sealing flaps.

8. The engine as set forth in claim 1, said hot fluid inlet including nozzle means disposed adjacent said loop member inlet for forcing hot fluid into said tank under pressure and creating a localized zone of lowered pressure proximal to said loop member inlet.

9. The engine as set forth in claim 1, including a cover for each bladder means respectively, and means pivotally supporting each cover for opening movement thereof under the influence of vaporization of the material within the associated bladder means.

10. The engine as set forth in claim 1, said tank being disposed within ambient atmosphere.

11. The engine as set forth in claim 1, said material being acetone.

12. The engine as set forth in claim 1, said tank including an inlet for delivery of heated fluid thereinto, and an outlet for withdrawing partially cooled liquid therefrom.

13. A method of converting the heat value of a hot fluid into useful energy, comprising the steps of:
   placing said hot fluid within an upright tank;
   passing a heat-transferring bladder into said tank at a lower region of the tank, said bladder containing a material having a vaporization temperature below the temperature of said hot fluid, said bladder being operatively coupled to a power takeoff; and
   allowing said material to vaporize in said bladder and effect raising of said bladder through said hot fluid by virtue of the buoyancy effect created by said vaporization for operation of said power takeoff.

14. The method as set forth in claim 13, said fluid being water.

15. The method as set forth in claim 13, said material being acetone.

* * * * *